June 4, 1935.  F. L. FULLER  2,003,783
ACCOUNTING MACHINE
Filed Nov. 22, 1933    4 Sheets-Sheet 1
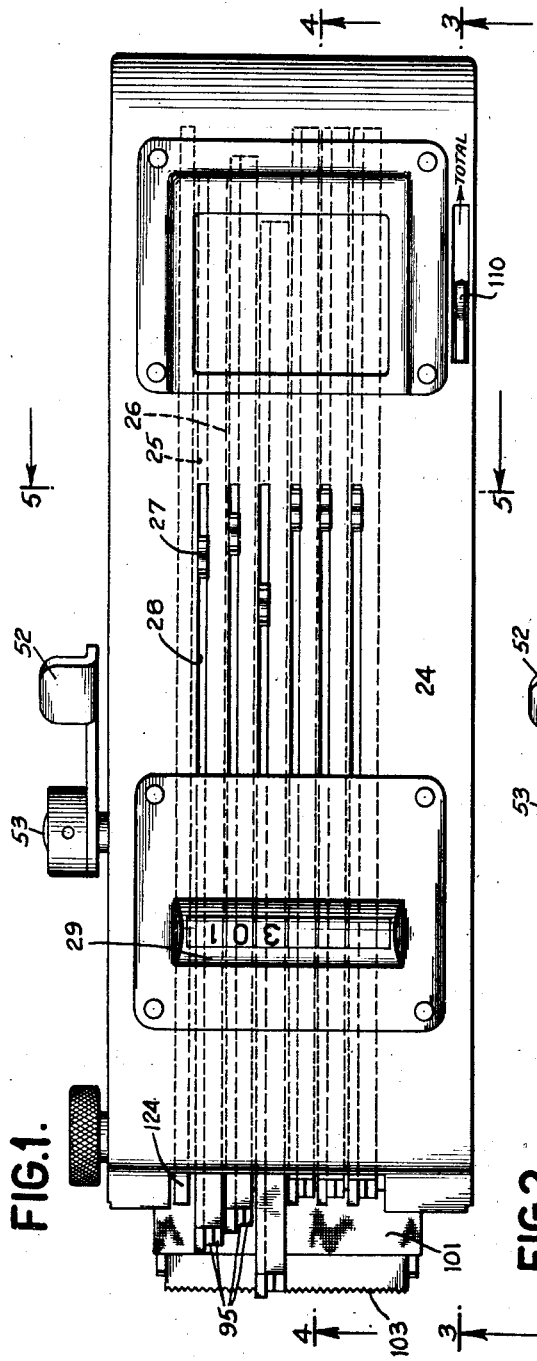
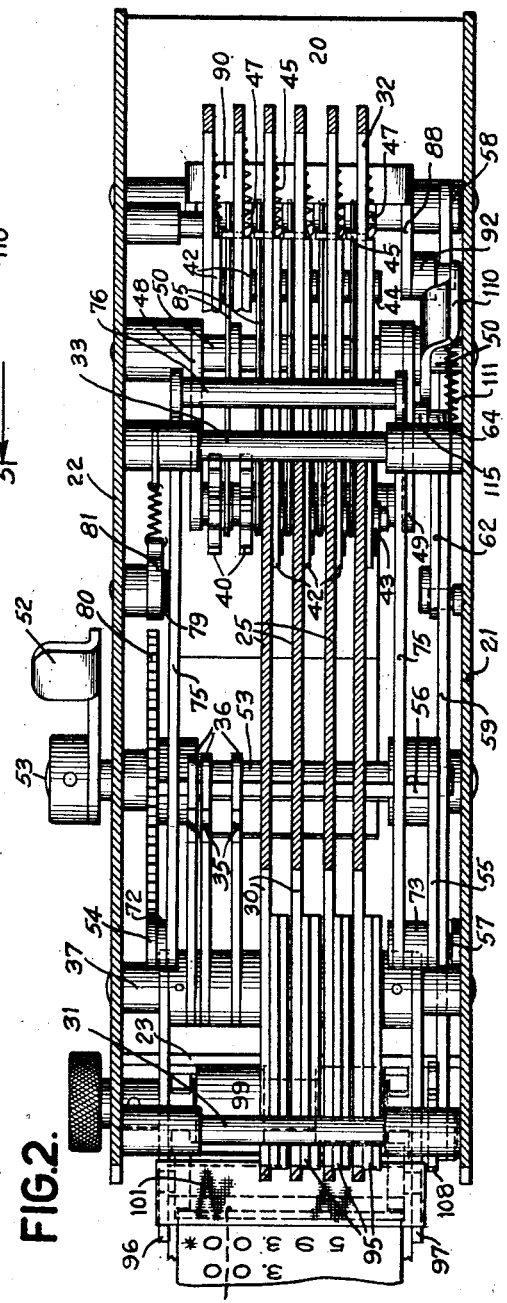
INVENTOR
Frederick L. Fuller
BY
ATTORNEY June 4, 1935. F. L. FULLER 2,003,783
ACCOUNTING MACHINE
Filed Nov. 22, 1933 4 Sheets-Sheet 2
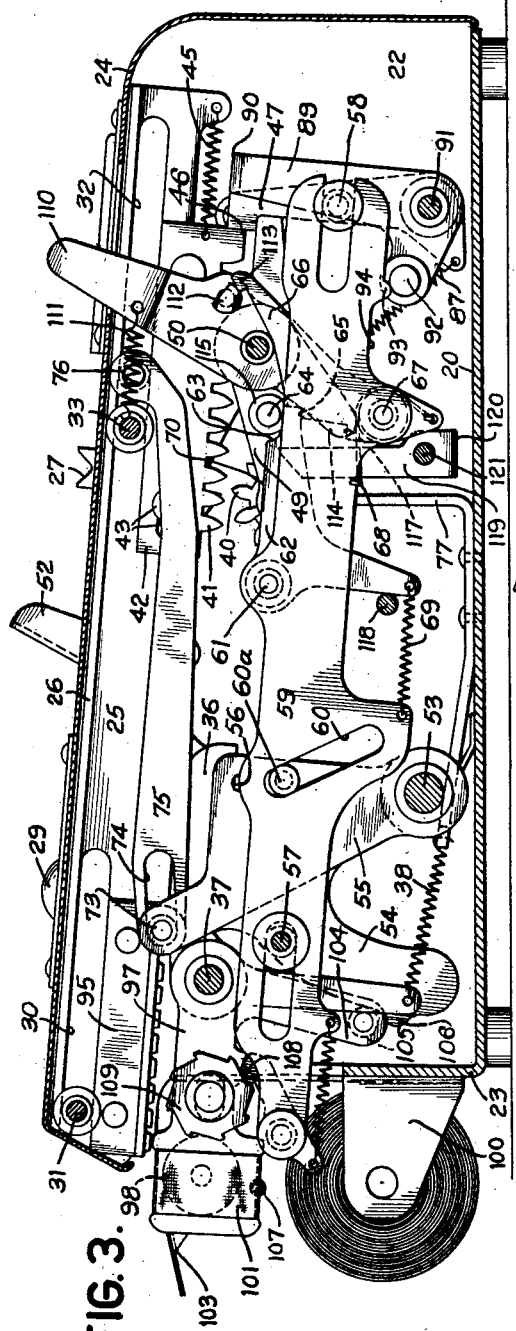
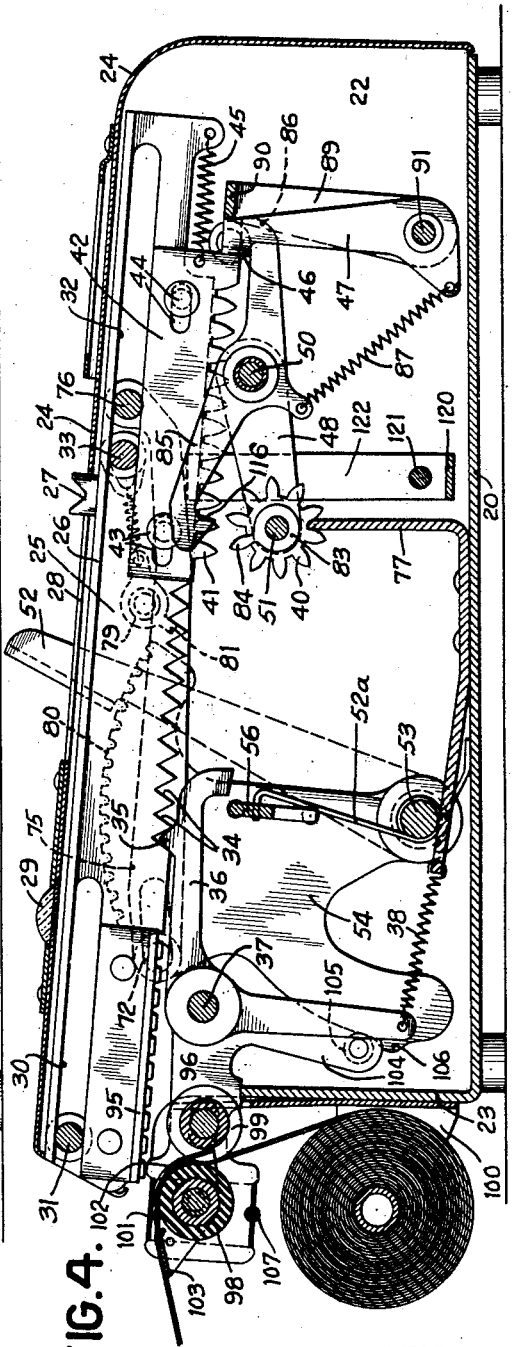
INVENTOR
Frederick L. Fuller
BY
W. M. Wilson
ATTORNEY June 4, 1935.  F. L. FULLER  2,003,783
ACCOUNTING MACHINE
Filed Nov. 22, 1933   4 Sheets-Sheet 3
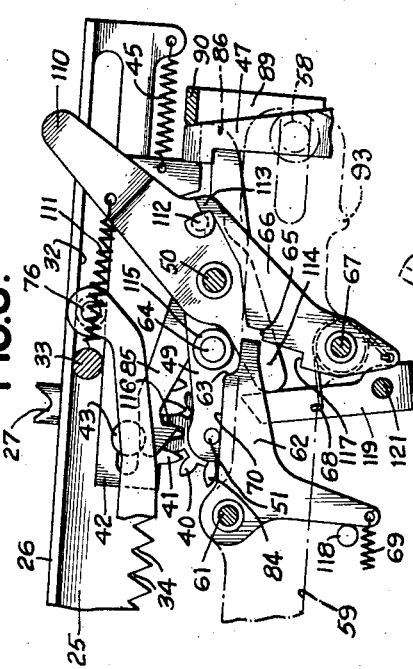
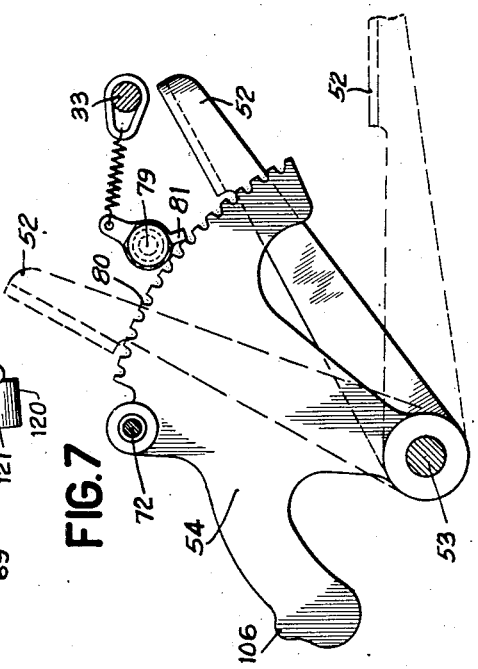
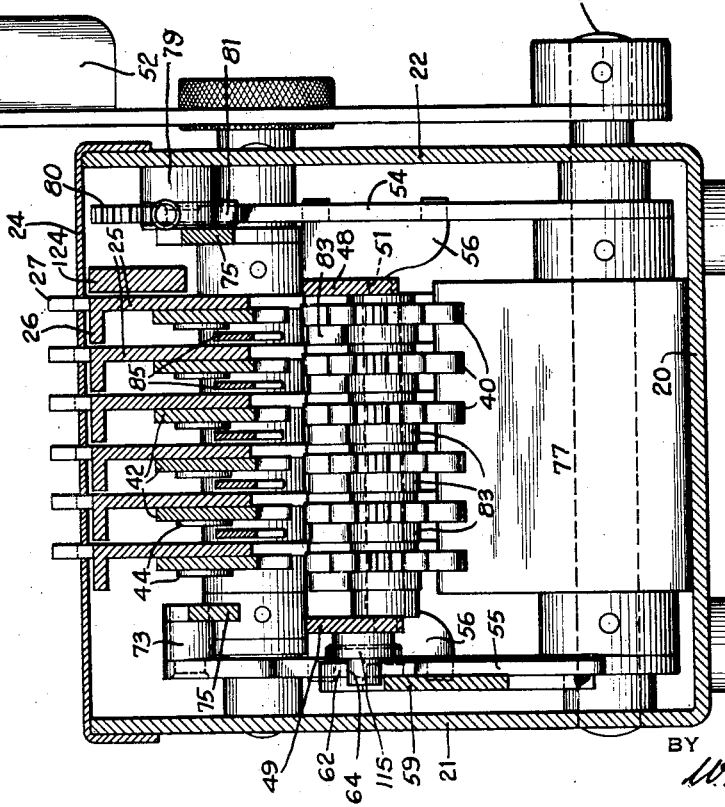
INVENTOR
Frederick L. Fuller
BY
ATTORNEY

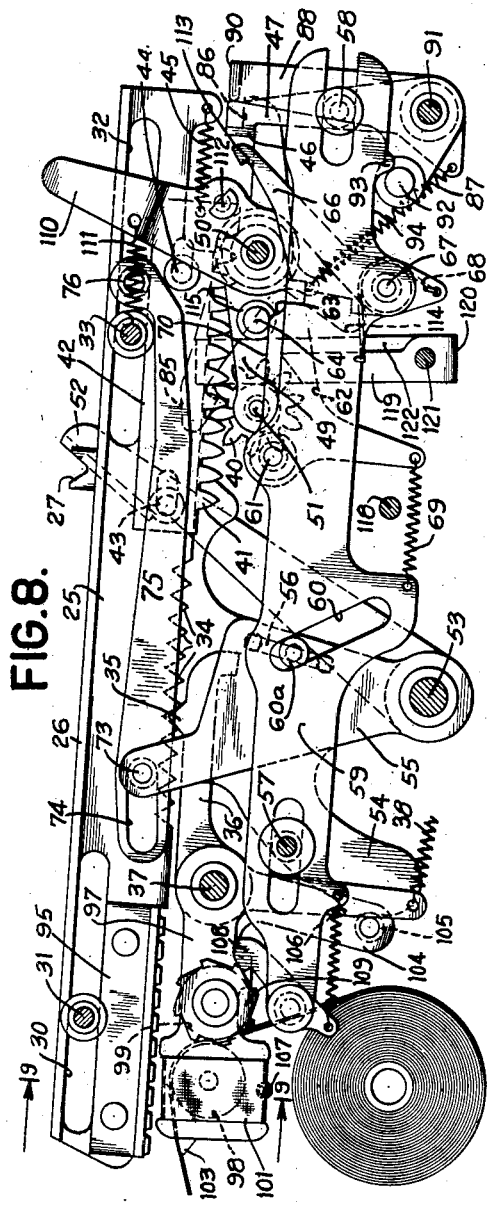
June 4, 1935.  F. L. FULLER  2,003,783
ACCOUNTING MACHINE
Filed Nov. 22, 1933  4 Sheets-Sheet 4

Patented June 4, 1935

2,003,783

UNITED STATES PATENT OFFICE 2,003,783

ACCOUNTING MACHINE

Frederick L. Fuller, West Orange, N. J., assignor to International Business Machines Corporation, New York, N. Y., a corporation of New York Application November 22, 1933, Serial No. 699,129

3 Claims. (Cl. 235—58)

The present invention relates to adding machines of the listing or recording type, whereby each item and the total of such items may be recorded.

The main object of the invention is to simplify hitherto used machines of this nature so as to avoid the requirement for keys and like mechanisms and to provide a machine which is simple in its construction whereby the functions ordinarily required of such machines can be accomplished by devices of simpler construction.

By the elimination of complicated mechanisms the cost of manufacturing and servicing such machines are greatly lessened and by selling such a machine at a low cost a market is obtained which previously did not exist by reason of the high cost of machines accomplishing like functions.

An object of the invention is to provide a simple item or value entering device comprising manually set indexing devices and co-ordinated total taking mechanism whereby the same indexing devices may also be employed for deriving a total, thus simplifying to a great extent the total taking devices previously used.

Another object of the invention is to provide such indexing devices with type members to provide for both printing the items and the total thereof, since obviously the adjustment of the indexing devices may represent either an item or a total.

A still further object is to provide a manually operable device which establishes a co-operative relationship between the accumulator and the indexing devices whereby the latter may upon adjustment zeroize the accumulator elements and thus secure the total thereon.

A still further object is to characterize a total for identification purposes by providing for the printing of an asterisk alongside of such printed total. A simple construction for providing for the above consists of a special type member which is shifted to printing position by adjustment of the total taking control lever, and is shifted out of printing position after a total printing operation.

Another object of the invention is to simplify the printing mechanisms provided for machines of the type illustrated by requiring fewer parts for effecting an item or total printing impression and feeding the record strip to space successive imprints.

A still further object is to provide a novel and simple form of zero printing mechanism whereby an indexing lever may be set to print a zero by the type but such setting operation will not be transmitted to the related accumulator element.

A still further object of the invention is to provide a suitable operating device in the form of a lever having suitable co-ordinated operated devices whereby various operations can be accomplished by a single manipulation of the lever.

Many other objects and advantages of the invention will appear from the detailed description of a preferred embodiment which will hereinafter be given and it will be noted that by the provision of simplified and improved form of mechanisms an adding machine is provided which is simple and relatively inexpensive in construction and positive in operation.

In said drawings:—

Fig. 1 is a plan view of the improved adding machine.

Fig. 2 is a horizontal sectional view of the machine, two of the indexing plates having been removed to more clearly show certain other parts of the machine.

Fig. 3 is a vertical longitudinal sectional view showing the left side of the machine in the position of the latter for operation and is taken on the line 3—3 of Fig. 1.

Fig. 4 is a vertical longitudinal sectional view taken on the line 4—4 of Fig. 1.

Fig. 5 is an enlarged horizontal cross sectional view of the machine and is taken on the line 5—5 on Fig. 1.

Fig. 6 is a view in side elevation showing the total control lever and its co-ordinated mechanism for conditioning the machine for a total taking operation.

Fig. 7 is a view in side elevation of a preferred form of full stroke device.

Fig. 8 is a view in side elevation of the right side of the machine showing the position of certain parts after an item entering operation has been instituted.

Fig. 9 is a vertical cross sectional view of the printing mechanism.

Fig. 10 is a detail showing the means provided for the adjustment of the total characterization printing bar.

The various mechanisms of the machine will now be described in sections, and as far as is possible in the sequence the functions are performed to secure the desired results.

Framework

The various mechanisms are supported by a framework consisting of a base plate 20, integral side frame plates 21, 22 and an integral end plate 23. The top of the machine is enclosed by a cover 24. (See Fig. 1.)

Index members

The values to be accumulated are set up by a series of longitudinal plates each consisting of a vertical plate 25 (Fig. 5) and an integral horizontal indicia carrying plate 26, the former having a portion 27 projecting through a longitudinal slot 28 (Fig. 1) of the cover 24. Each slide carries by the upper face of its horizontal plate 26 a series of numerals, 0–9 inclusive, which are individually visible through a slot formed in the top part of the cover 24 and magnified by a magnifying glass 29, shown best in Fig. 1. The portion 27 may be engaged by a suitable instrument, such as a pencil, or by the operator's finger so as to set up the desired value. In Fig. 1 three of the six index plates are shown shifted to represent "301", it being observed that to represent a zero the related index plate must be moved a units distance. For those index plates not involved in the calculation no setting is required and no indicia thereof will be seen through the magnifying glass 29 as is evident in Fig. 1 by the normal position of the index plates of the three higher denominational orders.

As is best shown in Figs. 3 and 4 the left end of each index plate has a longitudinal closed slot 30 (see also Fig. 8) in which fits a rod 31 carried by the side frame plates 21, 22 to thereby guide the index plate at its left end. The right end of each index plate has a closed slot 32 in which fits a rod 33 also carried by the side frame plates 21, 22, so as to guide the series of index plates 24 at their right ends.

Aligning devices for index members

The lower edge of each index plate 25 is provided with a series of wedge-shaped notches 34 (Fig. 4) in one of which notches fits the triangular-shaped projection 35 of a bell-crank constituting an aligning device 36, the notch engaged being dependent upon the position of adjustment of the related index plate 25. The series of bell-cranks 36 is loosely pivoted upon a rod 37 carried by the side frame plates 21–22 and each is resiliently shifted to accomplish the aligning function by a related spring 38.

Accumulator and item entering devices

The accumulator in which the values are entered comprises a series of six pinions 40, representing the first six denominational orders and each being in the plane of teeth 41 formed at the underside of a related rack 42 which is slidably mounted by slot and pin connections 43, 44 on the related index plate 25. When the pinions 40 are engaged with the teeth 41 of the racks 42 and the latter are restored to normal from their differentially adjusted positions it is obvious that the accumulator pinions 40 will be actuated a like amount.

In view of the fact that to represent and print a zero by a printing mechanism to be later described the index plates 25 must be given a unit step of adjustment it is desirable that this unit step of adjustment is not transmitted to any rack 42, for otherwise when it was restored to normal it would incorrectly enter a units value in the related pinion 40. To this end there is provided the slidable connections 43, 44 above referred to.

From Fig. 4 it is clear that a spring 45 connected between the rack 42 and related index plate normally tends to shift the rack plate 42 to the right a distance of one unit, as determined by the length of the slots formed in the rack 42, but such movement is normally restrained by the coaction of a lug 46 of an arm 47 with the right end of the related index plate 25, and for the present it may be considered that the arm 47 is immovable when the related index plate 25 is moved to set up an amount. It is evident, therefore, that in the units movement of the index plate 25 to the left no movement will be conveyed to the related rack 42, but the latter however, partakes of any further movement of the index plate 25, so that the rack 42 is then moved differentially and later, if no transfer operation is required, restored only a number of units commensurate with the value set up and desired to be entered.

Prior to the restoration of the racks 42 effected by means later to be described it is necessary to engage the accumulator pinions 40 with the rack teeth 41 of the related racks 42 and to this end the following accumulator engaging mechanism is provided.

The pinions 40 are carried by a frame consisting in part of a pair of arms 48, 49 both of which are loosely pivoted upon a rod 50 (see Fig. 2) carried by the side frame plates 22, 23. A rod 51 carried by the free ends of the arms 48, 49 forms a journal or support for the accumulator pinions 40 and other elements to be referred to hereinafter.

The main operating device for the machine comprises a reciprocable lever 52 which is operated externally of the machine by the operator, said lever being attached to a rock shaft 53 also carried by the side frame plates 22, 23. To said rock shaft there is connected a pair of irregularly shaped plates 54, 55, one on each side of the machine, as best shown in Figs. 2, 3 and 4. Between the plates 54, 55 there is securely attached by any convenient fastening means a cross plate 56, which cross plate provides a rigid operating frame.

Slidably mounted by means of a stud 57 which is carried by the side plate 21 and a stud 58 (Fig. 3) carried by an arm 88 and having only a limited arcuate movement about a shaft 91 is a plate 59 (see Fig. 8), said plate having an inclined slot 60 receiving a pin 60a carried by the plate 55. Pivotally mounted by a stud 61 to the plate 59 is a bell crank the horizontal arm 62 thereof being provided with an inclined cam edge 63 which, as shown in Fig. 2, is the plane of the portion of a stud secured to the arm 49 having the smaller diameter 64.

The right end of the horizontal arm 62 normally (Fig. 3) rests upon shoulder 65 of a latching arm 66 pivoted at 67 to the plate 59. A coil spring 68 of a well known form rocks lever 66 counterclockwise to maintain the shoulder 65 in engagement with the right end of arm 62 while a tension spring 69 extending between the vertical arm of the bell crank and plate 59 assists in maintaining the normal latching relationship.

It is evident that when lever 52 is depressed slightly from the normal position shown in Fig. 3 to the Fig. 8 position so as to initially rock the plate 55, the stud 60a secured thereto coacting with the cam slot 68 will shift the plate 59 to the Fig. 8 position during which time the cam edge 63 coacting with the roller 64 will elevate the pinions 40 and mesh them with the rack teeth 41. This engagement will be maintained during the continued depression of lever 52 since during this time a straight edge 70 forming a continuation of the cam edge 63 will retain the pinions elevated during which time, as will now be explained, the differentially adjusted racks 42 are returned to normal.

To the plates 54 and 55 there is secured a pair of studs 72, 73, respectively, which fit in slots 74 formed in a pair of members 75 which are spaced apart so that their free ends carry a rod 76 passing through the slots 32 of the index plates 25. Normally the rod 76 is positioned at the left ends of the slots 32. When the plates 54, 55 are initially rocked by the lever 52 the studs 72, 73 merely operate idly in the slots 74 so as not to shift the rod 76 during the time the accumulator is being engaged with racks 42. When such engagement is effected the members 75 are then shifted to the right so that the rod 76 engages the right end of the slots 32 of those index plates 25 that have been shifted beyond normal position, there being shown in Fig. 8 a differentially adjusted index plate 25. The restoring movement of the index plates occurs obviously at differential times, dependent upon their manual adjustment but during the restoration of the index plates 25 the pinions 40 will be turned one or more steps so as to enter the value set up into the accumulator. When the value has been entered the lever 52 is in its lowermost depressed position and is now returned by the operator with the assistance of a return spring 52a (Fig. 4) so that the parts are again in the normal position shown in Fig. 3.

It will be observed that when the pinions 40 are lowered which occurs when stud 64 rides down the cam edge 63 a vertical plate 77 of a plate secured to the base 20 engages an interdental space of each of said pinions to prevent accidental turning thereof. When the pinions are elevated before they leave the vertical plate 77 sufficiently to permit their free movement they engage the teeth 41 of the related racks 42 so that in any position the six accumulator pinions are positively locked against accidental rotation.

Full stroke device

To insure that the lever 52 is moved the full extent in either direction the following device may be employed. The plate 54, as is best shown in Fig. 7, is provided with a series of gear teeth 80 with which engages a spring pressed full stroke pawl 81 pivoted upon a stud 79 carried by frame plate 22. After a slight movement of plate 54 the leading tooth thereof engages and rocks the spring pressed full stroke pawl so that the tooth of the same engages the first tooth space of the teeth 80 so as to prevent any counterclockwise movement of lever 52 after the slight movement is continued. Upon a full depression of lever 52 the pawl 81 will be free of the ratchet teeth 80, whereupon pawl 81 is reversed when the plate 54 is rocked in a counterclockwise direction. The pawl 81, being in a position reversed to that shown in Fig. 7, will insure only a further counterclockwise or restoring movement of lever 52 until it is at normal, at which time pawl 81 is fully disengaged from the teeth 80 of the plate 54.

Transfer mechanism

Adjacent each pinion 40 there is secured thereto a partly circular plate 83 (Fig. 4) having a transfer tooth 84 for causing the carrying of a unit to a pinion of next higher denominational order. In the plane of each transfer tooth there is a related transfer arm 85 which is of a double arm formation and pivoted by the rod 50 at substantially its mid-center. The right end of the arm carries a hook 86 which is held up by a spring 87 connected to the arm 85 so that it normally holds the lug 46 of the arm 47 in such a position that when the index plate 25 is returned it may be moved one step independent of the related rack 42. This condition obtains only when no transfer is to be effected. In the event a transfer of a unit is to be effected it is obvious that when the accumulator frame is elevated and a particular pinion 40 passes through zero the related transfer tooth 84 will elevate the left end of arm 85, depressing its other end to release hook 86 from engagement with the lug 46 engaging the rack 42 of the next higher denominational order.

At this time attention is directed to the fact that the guide pin 58 for the right end of the plate 59 is carried by one arm 88 of a bail shaped frame consisting of the arm 88, (Fig. 8) an arm 89 (Fig. 4) and a cross bar 90 engaging all the arms 47 and connecting the arms 88 and 90. The bail is loosely pivoted upon a rod 91 which also forms the pivot for the series of abutment arms 47. The arm 88 of the bail is provided with a stud 92 normally engaging (as shown in Fig. 3) a projection 93 of the plate 59. When plate 59 is shifted slightly to the right to the position shown in Fig. 8 the projection 93 is carried to the position shown in Fig. 8 over the stud 92, this being permitted because stud 58 rocking about the pivot 91 slightly elevates the right end of the plate 59.

When the plate 59 is shifted further to the right as an incident to the value entering operation stud 92 will register with a recess 94 of plate 59 so that as a result cross bar 90 is not held in its normal position but unlocks the arms 47 so that it may be rocked to the right by virtue of the releasing of any arm 47 by a related operated transfer arm 85, since each of the former is rocked by the related spring 87 to shift the cross bar 90.

Therefore, with the cross bar 90 in position to permit the clockwise rocking of a related arm 47, when the arm 85 in engagement therewith releases the arm 47 due to the passing through zero of a wheel of lower denominational order, the lug 46 will allow the rack 42 of next higher order to move simultaneously with the related index plate 25 to its normal position. This rack 42 will thereupon rotate the accumulator pinion 40 of next higher order a single step. In the event that this pinion should represent a nine, in passing to zero it will trip the transfer arm 47 of the denominational order next higher to it, and thus transfers by transfers may be performed.

At the end of the transfer operation certain racks 42 employed for transferring will be in normal positions and others may be one step to the right of those at normal. To restore those racks that are in abnormal position cross bar 90 is employed. It is evident that at the final restoring movement of the plate 59 the projection 93 will engage the stud 92 to rock the bail in a counterclockwise direction thus shifting the racks 42 previously employed for a transfer operation through the intermediate arms 47 without, however, rotating pinions 40 as the latter have been lowered. The racks 42 which are thus shifted are held in their normal positions since projection 93 now holds the bail in normal position. (See Fig. 3.)

When the arms 47 which are employed in the transfer operation are back to normal springs 87 are effective to restore the transfer arms 85 so that their hooks 86 are elevated to catch over the lugs 46 of the related arms 47. The parts are now at normal so that in the next machine operation the index plates 25 can be set to represent a zero without causing a units operation of the related racks 42, thereby insuring proper entries for the succeeding machine operation.

Printing mechanism

It is desirable to print upon a record strip each item entered in the accumulator and for this purpose the present machine includes a record strip printing mechanism.

As best shown in Fig. 9 securely attached to the left end of each index plate 25 is a printing bar 95 carrying at its underside a complete series of digit characters. When an index plate 25 is at normal a blank space is presented to the printing line but upon adjustment of each index plate to represent the digit of a value to be entered the corresponding digit is presented to the printing line.

Secured to the shaft 37 is a frame comprising a pair of arms 96, 97 between which is journalled a platen roller 98 which is in frictional engagement with a feeding roller 99 also journalled between said arms 96, 97.

Carried by a plate 100 secured to the rear cover plate 23 is a record strip supply roll, the record strip of which passes between the rollers 98, 99 partly around the platen 98 and underneath the printing bars 95 and an inking ribbon 101. To guide the strip in its manual entry between the rollers there is provided a curved guide plate 102 and to facilitate the detachment of the printed part of the record strip from the rest of the roll a plate 103 (Fig. 3) is secured to printing frame, and may, if desired, be serrated.

Referring now to Fig. 4 it is seen that the arm 96 has an integral depending arm 104 provided with a cam roller 105 coacting by the weight of the printing unit to the left of its pivot 37 with a cam projection 106 of the plate 54.

The cam projection 106 is so designed that upon the initial movement of the operating lever 52 the record strip is forced against the type in printing position but immediately after the printing impression the roller 105 is free of the cam projection so that the printing unit can drop to its limit or normal position after which time the index plates 25 are free to be restored to normal from their differentially operated positions. Obviously the cam projection 106 will again rock the printer frame upon the last step of the return of lever 52, but no printing will be effected since the printing bars 95 are now in normal position.

The preferred inking device is shown in Fig. 9 and comprises as stated, an inking ribbon 101 which is carried by the side arms 96—97 of the printing frame, its free ends being connected by a spring 107 so as to keep the ribbon taut. The top horizontal edges of the arms 96, 97 keep the inking ribbon well above the record strip.

To space the printed items the plate 59 carries a spring pressed pawl 108 coacting with the ratchet wheel 109 secured to the pivot rod of the feeding roller 99 so as to turn said roller a step when the plate 59 returns to its normal position coincident with the return movement of lever 52.

Total taking mechanism

It is desirable to take a total of the amounts entered in the accumulator and also to print the same on the record strip.

To provide for taking a total under manual control there is provided a total taking lever 110 loosely pivoted upon the rod 60 and projecting through a slot in the cover 24 so as to be externally operable by the operator.

When the total lever is rocked clockwise about its pivot rod 60 and against the action of a spring 111, a half-round stud 112 carried by the lever will be caught by the hooked portion 113 of the latch lever 66, and the lever 110 will thereby be held in its rocked position.

A foot 114 of said total lever is, as best shown in Fig. 2, in the plane of the larger diameter 115 of the stud carried by the arm 49 of the accumulator frame, whereby the foot 114 will directly raise the accumulator frame and mesh the accumulator pinions 40 with the rack teeth 41, such engagement being retained by virtue of the latching of the total lever 110. This position of the parts is shown in Fig. 6. If amounts are represented by the accumulator pinions the latter have been rotated in a clockwise direction so that the transfer teeth 84 stand in different positions, dependant upon the different digits represented. When the total lever has shifted the pinions 40 into mesh with the racks 42, the operator, to secure the total shifts each of the index plates 25 to the left as far as it can go, which extent of movement for each is governed by the units of counterclockwise movement given to a pinion 40 necessary to cause its transfer tooth 84 to engage a shoulder 116 of a related transfer arm 85.

When such a relationship is established the accumulator element is cleared and the indicia on the index plate represents the digit previously standing on the associated accumulator pinion which is readable through the magnifying glass 29 and which is also represented by the type of the related printing member 95 at the printing line. Obviously, if in the operation just described a zero is represented for an order above the digit of the highest denominational order the related index plate is restored by the operator to normal to prevent printing of an unnecessary zero.

When the total is set up on the printing type, lever 52 is then operated which functions to print the total and restore in the manner previously described the index plates to their normal positions.

From a comparison of Figs. 3 and 6 it will be observed that when lever 66 is rocked in position to latch the total lever 110 the shoulder 65 thereof will be brought and held out of engagement with the horizontal arm 62, but as long as plate 59 remains in its normal position, spring 69 will not be effective to rock the bell crank which has a horizontal arm 62 so that its horizontal arm 62 drops to rest upon a lower latch shoulder 117 of the latch lever 66, since a stationary stud 118 normally engages the vertical arm of said bell crank.

Upon the initial movement of plate 59, effected by a slight depression of the lever 52, the pivot 61 of said bell crank will be moved to the right since it is carried by the plate 59. Thereupon the horiontal arm 62 by the action of spring 69 will be rocked so that its extremity drops and finally rests upon shoulder 117. The slightest movement of plate 59 will permit the horizontal arm 62 to lock the latch arm 66 against any counterclockwise movement and the latter continues to hold lever 110 in latched position until the hook 113 is shifted to the right sufficiently to be disengaged from the locking stud 112. It will be observed that at this time the horizontal arm 62 resting on shoulder 117 is in such a position that the cam portion 63 thereof is in a lowered position and thus ineffective to raise the pinions into mesh. When the total lever 110 is unlatched the accumulator pinions 40 will drop out of engagement with the rack teeth 41, and the accumulator pinions will remain in their zero positions. Thereafter, rod 76 will restore the index plates 25 to their normal positions.

It should be noted that upon the initial depression of the lever 52 a total will be printed from the printing bars 95 upon the record strip precisely in the manner previously explained. The record strip is fed, of course, a step of movement to separate the total from the last amount printed.

When plate 59 is restored to its normal position, stud 118 will cause the bell crank to be rocked, whereupon the lever 66 being free to rock counterclockwise will cause shoulder 65 to re-engage with the horizontal arm 62, the parts now being in the normal position, shown in Fig. 3, in readiness for a subsequent item entering operation.

Characterization of a total

It is very desirable that the total which is printed be suitably identified so as to distinguish it from the items that have been printed.

To this end the foot 114 of the total lever 110 is adapted to rock an upstanding arm 119 (Fig. 10) of a bail 120 which is loosely pivoted upon a stationary rod 121. The extremity of the other arm 122 of the bail 120 engages a notch 123 of a plate 124 which is positioned adjacent the units index plate 25, the plate 124 being slidably mounted on the aforesaid guide studs 31 and 33. When the bail 120 is rocked by the rocking of the total lever 110 a type character adapted to print an asterisk, or *, is brought to the printing position and held by an aligning bell-crank 36 so as to print such character as shown in Fig. 2 with an accompanying total.

The rod 76 also passes through the right slot of the plate 124 so as to restore the latter to normal after a total printing operation.

Method of securing a sub-total

A total visually ascertained may be re-inserted without clearing the same by immediately restoring the index plates 25, after the latter are shifted to the left to derive the standing on the accumulator. Thus, the amount previously on the accumulator is restored. The total lever is yet in latched position so that its function is negatived by slightly depressing lever 52. This will be sufficient to release lever 110 without, however, having the leading tooth of rack 80 caught by pawl 81. While arm 62 may drop to rest on the shoulder 117 the immediate retraction of the lever 52 (as a full stroke is not compulsory) will restore the bell-crank of which arm 62 is a part, as is evident by the action of pin 118 on the vertical arm of the bell-crank. Arm 62 will now rest on the upper shoulder 65 and the parts are in readiness for a subsequent item entering operation, adding items to the amount already on the accumulator.

What is claimed is as follows:—

1. In an accounting machine, in combination, an accumulator, a pivoted frame carrying said accumulator, a pivoted cam member, a latch lever having a shoulder which normally holds said cam member in position whereby the latter is normally effective to shift said frame, a total control device for shifting said frame and adapted to be latched in operated position by said latch lever, and means whereby said total control lever causes the latch lever to release the pivoted cam member for a movement which renders it ineffective to shift said frame.

2. In a machine of the class described, in combination, an accumulator, actuating racks, an arm having a cam portion, a latch for said arm, a slide carrying said latch and said arm and longitudinally movable whereby the cam portion engages the accumulator with the actuating racks, a total control device for causing the engagement of the actuating racks and accumulator and for rendering said latch ineffective, and resilient means for subsequently rocking said arm to cause the cam portion to be ineffective during the longitudinal movement of said slide.

3. In an accounting machine, in combination, an accumulator, a pivoted frame carrying said accumulator, a projection carried by said frame, a manually operated total control lever engaging said projection for rocking said frame for a total taking operation, a cam member engageable with said projection for rocking said frame for an item entering operation, means whereby said total control lever is latched and frees said cam member to take a position whereby the latter is ineffective, and a main operating member for releasing the total control lever from its latched position and for causing said cam member to take the position wherein it is effective.

FREDERICK L. FULLER.